United States Patent [19]
Mantle et al.

[11] 3,823,829
[45] July 16, 1974

[54] APPARATUS FOR REVERSE OSMOSIS OR HYPERFILTRATION TREATMENT OF FEED SOLUTIONS

[75] Inventors: Barry David George Mantle, Kent; Samuel Alan Hill, Motherwell, both of England

[73] Assignee: Babcock and Wilcox Limited, London, England

[22] Filed: May 16, 1973

[21] Appl. No.: 360,924

[30] Foreign Application Priority Data
May 18, 1972 Great Britain.................. 23440/72

[52] U.S. Cl.............................. 210/321, 210/433
[51] Int. Cl........................................ B01d 31/00
[58] Field of Search............. 210/23, 321, 490, 433

[56] References Cited
UNITED STATES PATENTS
3,542,204 11/1970 Clark ................................. 210/321

FOREIGN PATENTS OR APPLICATIONS
548,246  11/1957  Canada............................ 210/321

*Primary Examiner*—Frank A. Spear, Jr.
*Attorney, Agent, or Firm*—Kemon, Palmer & Estabrook

[57] ABSTRACT

Tubular membranes used in apparatus for reverse osmosis or hyperfiltration treatment of feed solutions, comprising a tubular semi-permeable membrane and a coaxial porous support tube, have improved end seals in which the support tube is provided with resilient end portions, a portion of the membrane at each end extends radially of the end face of the corresponding resilient end portion of the support tube and sealing means, e.g., O-rings or washers, urge the radially extending portions of the membrane into sealing contact with the resilient end portions.

10 Claims, 3 Drawing Figures

APPARATUS FOR REVERSE OSMOSIS OR HYPERFILTRATION TREATMENT OF FEED SOLUTIONS

The present invention relates to an apparatus for reverse osmosis or hyperfiltration treatment of various feed solutions, and a method for manufacturing the apparatus.

When a solution is subjected to reverse osmosis or hyperfiltration treatment, the solution to be treated (referred to as the feed solution) is placed in contact with one side of a semi-permeable membrane and subjected to a pressure in excess of the osmotic pressure of the solution. Solvent then passes through the semi-permeable membrane leaving the solute (or dissolved molecules) behind, thus tending to concentrate the solution on the pressurised side of the membrane and giving rise to pure solvent on the unpressurised side.

In practice, no known membranes are absolutely perfect in allowing the passage of pure solvent whilst completely rejecting the solute, but as this invention relates to a practical apparatus for the treatment of feed solutions, it is not necessary to discuss the efficiencies of the membranes themselves, and the invention can be understood by regarding the membrane as a hyperfiltration membrane which allows the passage of solvent whilst holding back dissolved solute molecules or any suspended particles.

Most work on reverse osmosis has been with aqueous solutions such as in the desalination of sea water and purification of brackish water where the water that passes through the membrane is the desired product, or alternatively, the work has been in the concentration of natural products such as fruit juices, cheese whey and various sugar solutions where the feed solution is retained after it has had excess water removed.

Very high osmotic pressures can be developed by many of these solutions and so the pressure differential across the semi-permeable membrane in reverse osmosis and hyperfiltration treatments is even higher since the artificial applied pressure has to overcome the natural osmotic pressure: pressures of 300 psig to 1500 psig are quite normal ones.

Thus it will be apparent that the membrane, which is usually a thin flexible polymeric film less than 1mm thick, needs to be supported on a more rigid base to prevent it merely inflating like a baloon. A convenient arrangement which has been previously suggested is to have the semi-permeable membrane in the form of a tube which is in contact with a porous rigid support tube. Most conveniently the semi-permeable membrane will be a coaxial tube inside the bore of the porous support tube, and in use the pressurised feed solution will pass down the common bore of the tubes and the hyper-filtered solvent will pass into and around the porous support tube: in an alternative embodiment the membrane may be outside the support tube in a pressurised vessel containing the feed solution with the hyper-filtered solvent passing into the bore of the support tube. However, the difficulty with both of such types of tubular apparatus arises at the ends of the tubes in that one needs an effective seal to prevent the pressurised feed solution seeping out under pressure around the back of the membrane and mixing with the hyper-filtered solvent.

It is an object of this invention to provide an improved apparatus incorporating tubular structures which are adequately sealed at the ends and which are easily manufactured or assembled.

According to the present invention an apparatus for reverse osmosis or hyperfiltration treatment of various feed solutions includes one or more tubular structures, each tubular structure comprising a tubular semi-permeable membrane supported by a co-axial porous support tube, the porous support tube being provided with resilient end portions, the membrane at each end portion extending radially over the end face of the corresponding resilient end portion of the support tube and sealing means arranged to urge the membrane into continuous sealing contact with the end faces of the resilient end portions of the support tube.

The semi-permeable mixture may be made of any of those materials used in the art of reverse osmosis; suitably it is a specially treated polymeric material such as cellulose acetate.

The porous support tube may be made from any material which is rigid and strong enough to withstand the applied pressure and which is inert to the solvent (usually water) being passed through it. Thus, sintered carbon, ceramic materials and the like are all possible, but a particularly preferred material is a fibre reinforced resin. The porosity of the support tube may be produced by having fine drillings and channels through the tube or preferably may be inherent in the structure of the material used to form the tube.

Porous resin structures preferably reinforced with carbon fibre or glass fibre are already known in the art, and are preferred. If the porosity is such as to permit radial flow of solvent only, longitudinal and/or circumferential grooves and channels may be made in the tube to aid collection or distribution of the hyperfiltered solvent.

The resilient end portions of the support tube may be inherently integral parts of the support tube wherein the ends have been treated, for example, by chemicals so as to make them resilient or the ends may be additional portions attached to the main body of the support tube for example by being screwed on, or clipped on or simply being in the form of one or more layers of resilient material applied to the ends of the tube so that they effectively become integral with the main tube body. It is preferred to have an integral end portion produced by treatment of the tube or by applying a layer of material.

Preferably, the resilient end portion should terminate in a flat end face at right angles to the axis of the tube but frusto-conical or rounded-off variations are possible as are the provisions of circular co-axial corrugations in the end face to give line seals.

Suitably, the resilient end portions are formed of a polymer. Preferably, the polymer is identical with the polymer employed in forming the semi-permeable membrane, though its structure may be different in that the polymer end portions need not be semi-permeable.

Where there is more than one tubular structure, advantageously, the tubular structures are connected in series flow relationship.

Additionally, according to the present invention there is provided a method of manufacturing an apparatus for reverse osmosis or hyperfiltration of various feed solutions, the apparatus including one or more tubular structures each of which includes a tubular semi-permeable membrane supported by a coaxial porous support tube, which method includes providing resilient material at the end portions of the support tube, applying a tubular semi-permeable membrane to the support tube, carrying the membrane radially over the end faces of the resilient end portions and urging sealing means against the membrane so as to maintain a continuous sealing contact with the end face of the resilient end portions.

The semi-permeable membrane may be pre-formed in a tubular shape and inserted using known techniques into a support tube provided with resilient end portions.

Alternatively, the semi-permeable membrane may be cast in situ, that is, onto the support tube provided with resilient end portions. Preferably in such a case it will be cast onto the interior cylindrical surface of the support tube.

Where the pre-formed semi-permeable membrane is inserted into the support tube, a tubular membrane which is larger than the support tube is positioned to extend through the support tube and beyond it at both ends. The portions of the membrane which extend beyond the support tube are softened by a known method, for example, by the application of a substance such as a placticizer to the surface of the tubular membrane adjacent to the support tube and projecting beyond it, and the end portions of the softened tubular membrane are then rolled back over the support tube.

The invention will now be described, by way of example, with reference to the accompanying partly diagrammatic drawings, in which.

Figure 1:
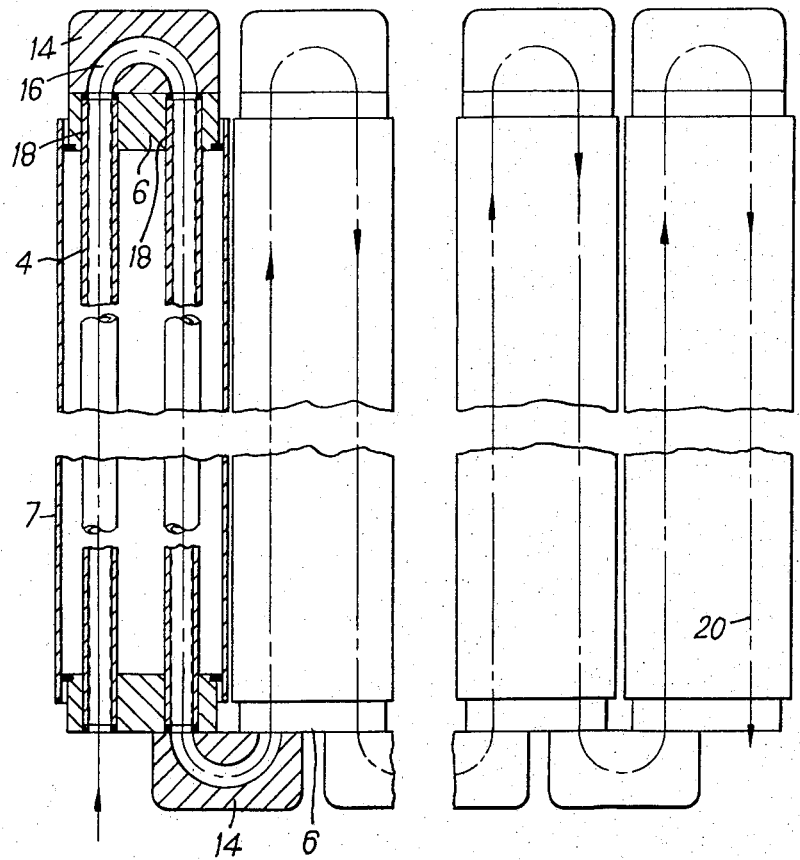
FIG. 1 is a side elevation, partly in section of a set of tubular structures.
Figure 2:
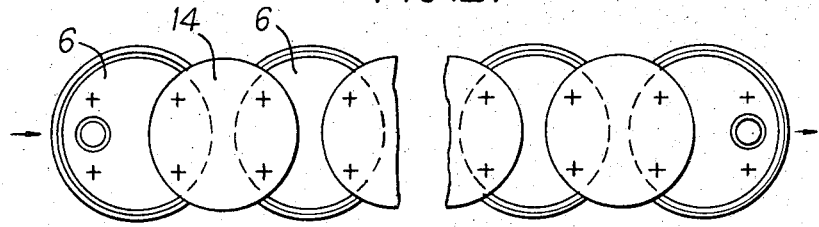
FIG. 2 is an end elevation corresponding to FIG. 1.
Figure 3:
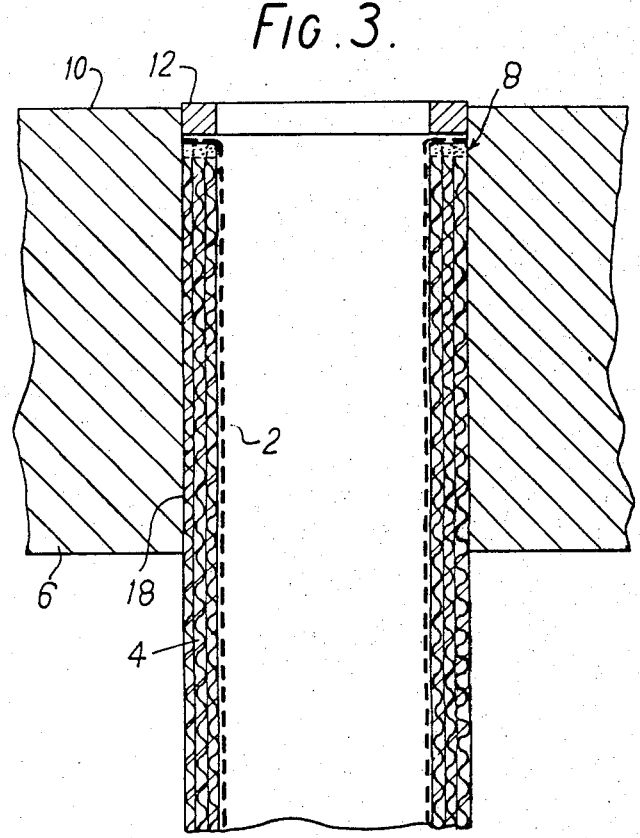
FIG. 3 is a portion of FIG. 1 greatly enlarged.

Referring to the drawings, tubular semi-permeable membranes 2 are supported on the inside of co-axial porous support tubes 4 having ends located and secured in open ended bores of the support blocks 6 positioned in sleeves 7. The porous support tubes 4 are provided with resilient pads 8 of polymeric material forming the end portions thereof and the semi-permeable membranes are flared outwardly at the end portions thereof so as to extend over the resilient pads of polymeric material as is hereinafter described.

The support tubes 4 are slightly short of the outer end faces 10 of the support blocks 6, resilient O-shaped seals or washers 12 being positioned in the consequent recesses, which seals are of such thickness as to effect a complete seal upon connecting blocks 14 being bolted to the support blocks 6 to compress the membranes 2 between the resilient pads 8 on the tubes and the resilient seals or washers 12. The connecting blocks 14 are formed with U-shaped tubular passages 16 of a bore diameter equal to the internal diameter of the support tubes 4 and are bolted to the support blocks 6 with the passages in register with the support tubes. Each support block 6 is formed with a pair of parallel bores 18 and the support tubes 4 are connected in series flow relationship by positioning the connecting blocks 14 so as to connect to each other the ends of both support tubes in a given support block at one end of that support block, and to connect the other ends of the support tubes in that support block through another support block positioned at the other ends of those two tubes, to the ends of further support tubes at adjacent support blocks so as to form a sinuous flow path, as indicated by the chain dotted line 20.

In assembling the tubular structures, sharp rough edges and loose fibres are removed from the ends of the support tubes 4 with an abrasive such as emery polishing paper after the support tube has been bonded to a support block 6 at each of its ends.

A thin layer of cellulose acetate solution, for example a 15 percent solution of cellulose acetate (E-398-6 commercial grade) in acetone (Analar commercial grade) is applied to the ends of the tube and allowed to dry in air to form resilient pads. Semi-permeable membrane in the form of a continuous roll of flattened tube is cut, before insertion, approximately four inches longer than the support tube.

The membrane is inserted by attaching a clamp (such as an alligator type grip) to the membrane and pulling the clamp through the support tube, subsequently inflating the tubular membrane (using a very gentle air stream or gas supply) to bear against the support tube. Once the membrane has been inserted into the support tube it is trimmed so that it extends beyond the end of the tube by an amount approximately equivalent to the wall thickness of the support tube. With a fibre reinforced resin tube this will be about ⅛ inch.

Placticizer is applied sparingly to external surface of the membrane situated outside the support tube, and allowed to penetrate for about 2 minutes to soften the membrane. The membrane situated beyond the support tube is then pushed outwards to overlie the end of the support tube by inserting a balloon into the end of the membrane tube and support tube and inflating it.

The resilient seal 12 which may be of rubber and provided with lubricant, is then placed against the membrane, connecting blocks 14 are bolted to the support blocks thereby compressing the seals 12.

If required, to ensure complete sealing, adhesive may be provided between the semi-permeable membrane and the resilient end portion on the support tube and/or between the semi-permeable membrane and the resilient seal or washer.

When the tubular structure is assembled it is flushed with water to wash placticiser from the membrane. Subsequently, water is run through the tubular structure under a pressure greater than the operating pressure for approximately 15 minutes.

Conveniently, all the support blocks 6 are of identical form, and all the connecting blocks 14 are of identical form. When a support block contains a pair of bores, as hereinbefore described, it can be regarded as a pair of single bore support blocks already connected together, or simply as a double block. Similarly, all the connecting blocks containing the U-shaped passage are conveniently of identical form regardless of whether they are to connect the two bores of one double support block together or the adjacent bores of two separate support blocks, single or double, to each other. Thus all the bores are of the same diameter and the same positioning relative to the bolt holes, and the bolt holes are at constant pitching so that any blocks can be connected together and the bores will be in register.

Whilst support blocks containing a pair of bores have been described and are preferred it will be appreciated that support blocks containing any number of bores can be prepared provided that they are multiples of identical single bore blocks and two or more similar or dissimilar blocks can be fastened together to produce "double" bore support blocks or multiples thereof. Similarly, the connecting blocks each containing a U-shaped passage can be produced as multiple connecting blocks.

We claim:

1. Apparatus for reverse osmosis or hyperfiltration treatment of feed solutions including at least one tubular structure comprising a tubular semi-permeable membrane supported by a co-axial porous support tube, the porous support tube being provided with resilient end portions terminating in end faces, the membrane extending radially over the said end faces, and sealing means at each end portion for separating a region internal of the tubular semi-permeable membrane from a region external thereto, each of said sealing means including a member provided with a face complimentary to the adjacent end face of the porous support tube and means urging the sealing means axially towards the porous support tube to clamp the radially extending portion of the membrane between the end face of the resilient end portion of the porous support tube and the complementary surface of the sealing means in continuous sealing contact.

2. An apparatus according to claim 1 wherein the end faces of the porous support tube and the complimentary faces of the sealing means are plain surfaces at right angles to the axis of the support tube.

3. An apparatus according to claim 1 wherein the semi-permeable membrane extends internally of said porous support tube.

4. An apparatus as claimed in claim 1 wherein the apparatus includes a plurality of tubular structures connected in series flow relationship.

5. An apparatus as claimed in claim 1 wherein the resilient end portions of the porous support tube are formed of a polymer.

6. An apparatus as claimed in claim 1 wherein the semi-permeable membrane is formed of a polymer which is identical in formula with the polymer employed in forming the resilient end portions of the porous support tube.

7. An apparatus according to claim 2 including a plurality of porous support tubes positioned against the end portions thereof in support blocks mounted in sleeves co-extending with the porous support tubes.

8. An apparatus as claimed in claim 7 wherein the porous support tubes are positioned in bores in the support blocks with the end faces of the resilient end portions of the porous support tubes inwardly spaced from outer end faces of the support blocks to form a seating for the sealing means, connector blocks having passages arranged to permit flow interconnection of the porous support tubes being positionable against the outer end faces of the support blocks, said connector blocks and support blocks being provided with the means for urging the sealing means axially towards the porous support tube.

9. An apparatus as claimed in claim 8 wherein the sealing means includes a resilient O-shaped seal.

10. An apparatus as claimed in claim 9 wherein the porous support tubes are arranged as banks of tubes with constant pitching and all of the support blocks and all of the connecting blocks respectively are of identical form.

* * * * *

UNITED STATES PATENT OFFICE
CERTIFICATE OF CORRECTION

Patent No. 3,823,829　　　　　　　　　Dated July 16, 1974

Inventor(s) Barry David George Mantle and Samuel Alan Hill

It is certified that error appears in the above-identified patent and that said Letters Patent are hereby corrected as shown below:

Column 2, line 15, change "mixture" to --membrane--.

Signed and sealed this 8th day of October 1974.

(SEAL)
Attest:

McCOY M. GIBSON JR.　　　　　　　　　C. MARSHALL DANN
Attesting Officer　　　　　　　　　　Commissioner of Patents